US012723126B2

(12) United States Patent
Sun et al.

(10) Patent No.: US 12,723,126 B2
(45) Date of Patent: Sep. 1, 2026

(54) ALIPHATIC POLYISOCYANATE COMPOSITION, PREPARATION METHOD THEREFOR, AND COATING COMPOSITION

(71) Applicant: WANHUA CHEMICAL GROUP CO., LTD., Shandong (CN)

(72) Inventors: Lidong Sun, Shandong (CN); Shuchang Sun, Shandong (CN); Yonghua Shang, Shandong (CN); Hao Hu, Shandong (CN); Haotian Zhang, Shandong (CN); Bin Shi, Shandong (CN); Peimeng Shi, Shandong (CN); Wei Liu, Shandong (CN)

(73) Assignee: WANHUA Chemical Group Co. LTD., Shandong (CN)

( * ) Notice: Subject to any disclaimer, the term of this patent is extended or adjusted under 35 U.S.C. 154(b) by 616 days.

(21) Appl. No.: 17/636,736

(22) PCT Filed: Jul. 21, 2020

(86) PCT No.: PCT/CN2020/103277

§ 371 (c)(1),
(2) Date: Feb. 18, 2022

(87) PCT Pub. No.: WO2021/088416

PCT Pub. Date: May 14, 2021

(65) Prior Publication Data

US 2022/0298293 A1 Sep. 22, 2022

(30) Foreign Application Priority Data

Nov. 8, 2019 (CN) ........................ 201911089110.9

(51) Int. Cl.
*C08G 18/79* (2006.01)
*C08G 18/62* (2006.01)
*C09D 175/02* (2006.01)

(52) U.S. Cl.
CPC ....... *C08G 18/792* (2013.01); *C08G 18/6229* (2013.01); *C09D 175/02* (2013.01)

(58) Field of Classification Search
CPC ......................... C08G 18/792; C08G 18/6229; C08G 18/022; C08G 18/1883; C08G 18/2081; C08G 18/6216; C08G 18/73; C08G 18/755; C08G 18/79; C08G 18/1875; C09D 175/02; C09D 175/04
See application file for complete search history.

(56) References Cited

U.S. PATENT DOCUMENTS

| | | | | |
|---|---|---|---|---|
| 5,914,383 | A * | 6/1999 | Richter ................ | C07D 273/04 540/200 |
| 2007/0123613 | A1 | 5/2007 | Weikard et al. | |
| 2018/0086938 | A1* | 3/2018 | Schaefer ................ | C08G 18/10 |

FOREIGN PATENT DOCUMENTS

| | | | | |
|---|---|---|---|---|
| CN | 1582309 | A | 2/2005 | |
| CN | 1239550 | C | 2/2006 | |
| CN | 1757639 | A | 4/2006 | |
| CN | 1302038 | C | 2/2007 | |
| CN | 101531641 | A | 9/2009 | |
| CN | 106604944 | A | 4/2017 | |
| CN | 107531875 | A | 1/2018 | |
| CN | 107531876 | A | 1/2018 | |
| CN | 107868226 | A | 4/2018 | |
| CN | 108431171 | A | 8/2018 | |
| CN | 108848670 | A | 11/2018 | |
| CN | 109071764 | A | 12/2018 | |
| CN | 109563230 | A | 4/2019 | |
| CN | 110156956 | A | 8/2019 | |
| CN | 110790895 | A | 2/2020 | |
| EP | 3527602 | A1 * | 8/2019 | ........... C08G 18/022 |
| JP | 2015127368 | A * | 7/2015 | |
| WO | 2008003282 | A1 | 1/2008 | |

OTHER PUBLICATIONS

Kie, JP2015127368-MT (Year: 2015).*
Office Action issued on Mar. 9, 2021 by the JPO in the corresponding Patent Application No. 201911089110.9, with English translation.
Decostanzi, et al.: "Reactivity and kinetics of HDI-iminooxadiazinedione: Application to polyurethane synthesis", European Polymer J. 96 (2017), pp. 443-451.
Progress in High Performance Environmental Friendly PU Floor Coatings, Coatings Review (2012), 1994-2015 China Acad. J. Electronic Publishing House, http://www.chki.net, pp. 1-7.
Widemann, et al.: "Structure-property relations in oligomers of linear aliphatic diisocyanates", ACS Sustainable Chem. Eng. (2018), pp. 1-19.
Hu Jin: "Synthetic technology and polymerization process of TDI trimer curing agents", Dissertation, China (2017), pp. 1-62.
International Search Report issued in PCT/CN2020/0103277 on Oct. 27, 2020.
European Search Report issued on Oct. 16, 2023 by the CIPO in the corresponding Patent Application No. 20885750.8-1102.

* cited by examiner

*Primary Examiner* — Mark Eashoo
*Assistant Examiner* — Zhen Liu
(74) *Attorney, Agent, or Firm* — EVAN LAW GROUP LLC

(57) ABSTRACT

Disclosed is an aliphatic polyisocyanate composition, wherein the molar ratio of an iminooxadiazinedione structure to an isocyanurate structure is 0.01-0.8:1, and the molar ratio of an iminooxadiazinedione structure in a polymer larger than three molecules to the iminooxadiazinedione structure in the composition is 0.2-0.8:1. Provided are a method for preparing the aliphatic polyisocyanate composition, and a coating composition. The aliphatic polyisocyanate composition has both a lower viscosity and a better crosslinking property. The composition can significantly reduce the usage amount of a solvent when used in a coating composition, is more environmentally friendly and also has a better paint film property. The preparation method has a simple process and mild conditions, is easy to operate and control, and is suitable for industrial scale production.

20 Claims, No Drawings

ALIPHATIC POLYISOCYANATE COMPOSITION, PREPARATION METHOD THEREFOR, AND COATING COMPOSITION

CROSS REFERENCE TO RELATED APPLICATIONS

This application is a national phase under 35 U.S.C. § 371 of International Application No. PCT/CN2020/103277 filed on Jul. 21, 2020, which claims the benefit of priority from Chinese Patent Application No. 201911089110.9 filed on Nov. 8, 2019. The entire contents of these applications are incorporated herein by reference in their entirety.

TECHNICAL FIELD

The present disclosure relates to the field of coatings and specifically relates to an aliphatic polyisocyanate composition, a preparation method thereof, and a coating composition obtained from the aliphatic polyisocyanate composition.

BACKGROUND

Because of the excellent weatherability of aliphatic polyisocyanates having an aliphatic isocyanurate structure, the aliphatic polyisocyanates have been widely used in high-end fields such as automobile OEM (original equipment manufacturer) coatings and refinishing coatings, especially varnish. In recent years, due to the enhancement of environmental protection requirements, the reduction of the viscosity of aliphatic polyisocyanates and the reduction of the usage amount of solvents have become the development trend. Generally, in order to achieve the low viscosity of aliphatic polyisocyanates and maintain good crosslinking properties, the diisocyanate is subjected to the trimerization reaction by changing catalysts or processes to generate a polymer having an isocyanurate structure and generate a certain proportion of a polymer having an iminooxadiazinedione structure.

The viscosity of aliphatic polyisocyanates is very dependent on the type of the raw material diisocyanate, the reaction conversion rate and the product composition. Generally, under the condition of the same type of aliphatic diisocyanate, the higher the reaction conversion rate, the higher the viscosity of the product. With the same conversion rate, the higher the proportion of a polymer having an iminooxadiazinedione structure, the lower the viscosity of the aliphatic polyisocyanate. However, because the structural stability and crosslinking property of the iminooxadiazinedione structure are obviously poorer than those of the isocyanurate structure, the polymer having an iminooxadiazinedione structure must be kept in an appropriate proportion to achieve both the low viscosity and excellent paint film performance.

CN106604944A discloses a polyisocyanate composition, a coating composition, a coating film and a manufacturing method therefor, and a humidity-stabilization method, where the molar ratio of a polymer having an iminooxadiazinedione structure to a polymer having an isocyanurate structure is limited to 0.00050-0.30. This patent shows that a coating film having excellent adhesiveness with a base coating film can be formed by controlling the above-mentioned molar ratio to be less or equal to 0.30, which means that the content of the polymer having an iminooxadiazinedione structure actually has an effect on the performance of the coating film, but the cause for the effect is not further disclosed.

WO2007046470A1 discloses a highly-crosslinkable low-viscosity polyisocyanate composition and a coating composition containing same, and the viscosity of the product is reduced by controlling the ratio of isocyanurate in the composition to allophanate and uretedione prepared from alcohol. However, the uretedione structure actually forms a linear polymer by crosslinking, which has an adverse effect on the hardness and weatherability of the paint film.

CN101165048A discloses a method for preparing a polyisocyanate including a polymer having an iminooxadiazinedione structure, and this patent discloses that the iminooxadiazinedione structure can reduce the viscosity of the polyisocyanate and has a better crosslinking property than uretedione structure having a linear crosslinking product (see Proc. of XXIVth Fatipec Conference, 8-11, June 1998, Interlaken, CH, Vol. D, pp. D-136-137).

As can be known from the existing art, the introduction of an iminooxadiazinedione structure into the aliphatic polyisocyanate composition can reduce the viscosity of the aliphatic polyisocyanate. However, it is difficult to ensure the excellent properties of the prepared paint film while the iminooxadiazinedione structure was introduced. Therefore, it is necessary to develop an aliphatic polyisocyanate to reduce the viscosity and maintain the good crosslinking property as well, so as to ensure the excellent properties of the paint film.

SUMMARY

In order to overcome the above-mentioned defects in the existing art, an object of the present disclosure is to provide an aliphatic polyisocyanate composition that has a low viscosity and guarantees the performance of the resulting paint film as well.

Another object of the present disclosure is to provide a method for preparing an aliphatic polyisocyanate composition.

Yet another object of the present disclosure is to provide a coating composition.

The aliphatic polyisocyanate composition provided by the present disclosure is prepared by taking an aliphatic diisocyanate as a starting material and is composed of a trimolecular polymer and a polymer larger than three molecules, both of which are formed by the aliphatic diisocyanate. The composition has an iminooxadiazinedione structure (as shown in Formula 1) and an isocyanurate structure (as shown in Formula 2), where the molar ratio of the iminooxadiazinedione structure in the composition to the isocyanurate structure in the composition is 0.01-0.8:1, and the molar ratio of the iminooxadiazinedione structure in the polymer larger than three molecules to the iminooxadiazinedione structure in the composition is 0.2-0.8:1.

Formula 1

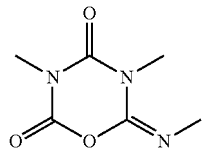

Formula 2

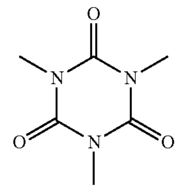

Generally, the aliphatic polyisocyanate composition mainly includes a trimolecular polymer and a polymer larger than three molecules (other components are negligible), both of which are produced by polymerization of an aliphatic diisocyanate in the presence of a catalyst. The polymer larger than three molecules includes a pentamolecular polymer, a heptamolecular polymer, a nonamolecular polymer, a multimolecular polymer and so on.

The trimolecular polymer includes an isocyanurate ring or includes an iminooxadiazinedione ring, N on the structure of the ring is linked with residues of a diisocyanate monomer except for groups involved in the cyclization structure (as shown in Formulas 3 and 4, respectively), and R represents the part of the diisocyanate monomer, which includes no NCO group.

Formula 3

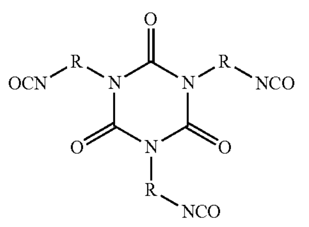

Formula 4

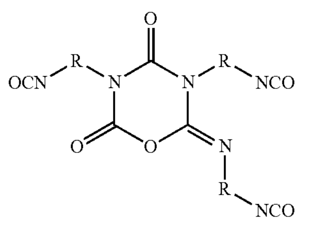

The pentamolecular polymer is composed of 1 isocyanurate ring linked with 1 isocyanurate ring, 1 isocyanurate ring linked with 1 iminooxadiazinedione ring, and 1 iminooxadiazinedione ring linked with 1 iminooxadiazinedione ring. The heptamolecular polymer is obtained by introducing 1 isocyanurate ring or 1 iminooxadiazinedione ring into the pentamolecular polymer. The rest can be done in the same manner.

Although the iminooxadiazinedione structure in the polyisocyanate composition can reduce the viscosity of the composition, the thermal stability of the iminooxadiazinedione structure is poorer than the thermal stability of the isocyanurate structure, and thus, when the content of the iminooxadiazinedione structure is high, the heat resistance of the paint film prepared by crosslinking is poor. However, the inventors have found that when a single iminooxadiazinedione ring is further polymerized to form a macromolecular polymer having a single iminooxadiazinedione ring and one or more isocyanurates, that is, when a polymer larger than three molecules having an iminooxadiazinedione structure is formed, the heat resistance of the paint film prepared by crosslinking can be significantly improved.

In the composition provided by the present disclosure, a molar ratio of the iminooxadiazinedione structure in the composition to the isocyanurate structure in the composition may be 0.01:1, 0.05:1, 0.08:1, 0.1:1, 0.2:1, 0.3:1, 0.4:1, 0.5:1, 0.6:1, 0.7:1, 0.8:1 or any other ratios or a ratio range of any combination thereof.

In the composition provided by the present disclosure, a molar ratio of the iminooxadiazinedione structure in the polymer larger than three molecules to the iminooxadiazinedione structure in the composition may be 0.2:1, 0.3:1, 0.4:1, 0.5:1, 0.6:1, 0.7:1, 0.8:1 or any other ratios or a ratio range of any combination thereof.

In the composition provided by the present disclosure, the trimolecular polymer may account for 30% to 75% of the mass of the aliphatic polyisocyanate composition, for example, 30%, 35%, 40%, 45%, 50%, 55%, 60%, 65%, 70%, 75% or any other content values or a content range of any combination thereof.

In the composition provided by the present disclosure, the aliphatic diisocyanate may be any type of known aliphatic diisocyanates for preparing the aliphatic polyisocyanate, including, but not limited to, tetramethylene-1,4-diisocyanate, pentamethylene-1,5-diisocyanate, hexamethylene-1,6-diisocyanate, isophorone diisocyanate, and dicyclohexylmethane diisocyanate.

In some preferred embodiments, the aliphatic diisocyanate may be hexamethylene-1,6-diisocyanate (HDI) or isophorone diisocyanate (IPDI).

A preparation method for aliphatic polyisocyanate composition provided by the present disclosure includes the following steps:

S1: taking an aliphatic diisocyanate as a starting material, performing a reaction in the presence of a catalyst A to obtain a reaction liquid I, wherein the catalyst A is selected from the group consisting of tetraethylammonium fluoride, tetra-n-butylammonium fluoride, hexadecyltrimethylammonium fluoride, tetramethylammonium triazolate, tetrabutylphosphine triazolate, and tetrabutylphosphonium benzotriazolate;

S2: taking the reaction liquid I obtained in step S1 as raw material, continuing the reaction in the presence of a catalyst B to obtain a reaction liquid II, where the catalyst B is selected from the group consisting of tetramethylammonium acetate, dodecyltrimethylammonium octanoate, DABCO TMR, and N,N,N-trimethyl-N-hydroxypropyl quaternary ammonium salt; and S3: separating unreacted aliphatic diisocyanate by thin-film evaporation.

In the preparation method provided by the present disclosure, in the presence of the catalyst A, the reaction liquid I contains many iminooxadiazinedione structures, and in the presence of the catalyst B, few iminooxadiazinedione structures are generated, while the aliphatic diisocyanate is further formed into a multimer, so as to control the content and distribution of the iminooxadiazinedione structure in the obtained product, thereby obtaining the aliphatic polyisocyanate composition with excellent performance. Moreover, the preparation method provided by the present disclosure hardly generate other structures or impurities that affect the properties of the aliphatic polyisocyanate composition.

In the preparation method provided by the present disclosure, the content and distribution of the iminooxadiazinedione structure may depend on the reaction conversion rate distribution in steps S1 and S2.

In some preferred embodiments, in step S1, when the reaction conversion rate reaches 1% to 20%, the reaction is terminated to obtain the reaction liquid I.

In some preferred embodiments, in step S2, when the reaction conversion rate reaches 25% to 65%, the reaction is terminated to obtain the reaction liquid II.

In the preparation method provided by the present disclosure, the catalyst A used in step S1 may be other fluorinated quaternary ammonium salts having catalytic properties similar to the catalytic properties of tetraethylammonium fluoride, tetra-n-butylammonium fluoride, hexadecyltrimethylammonium fluoride and so on, or may be other quaternary ammonium triazole salts having catalytic properties similar to the catalytic properties of tetramethylammonium triazolate, tetrabutylphosphine triazolate, tetrabutylphosphine benzotriazolate and so on.

In the preparation method provided by the present disclosure, the catalyst B used in step S2 may be other carboxylic acid quaternary ammonium salts having catalytic properties similar to the catalytic properties of tetramethylammonium acetate, dodecyltrimethylammonium octanoate, DABCO TMR, N,N,N-trimethyl-N-hydroxypropyl quaternary ammonium salt and so on.

In the preparation method provided by the present disclosure, the reaction in steps S1 and S2 may be performed at a temperature of 55° C. to 70° C.

In the preparation method provided by present disclosure, the thin-film evaporation may be performed at a temperature of 120° C. to 180° C.

In the preparation method provided by the present disclosure, the terminating agent for terminating the reaction may be selected according to the types of catalysts A and B, for example, the terminating agent may be di-n-butyl phosphate.

The coating composition provided by the present disclosure includes the aliphatic polyisocyanate composition described in any one of the above-described technical solutions.

The coating composition provided by the present disclosure may further include any known auxiliary components, including but not limited to an acrylic polyol, a polyester polyol and so on.

In some embodiments, the acrylic polyol is selected from polyols polymerized by one or more of the following monomers selected from the group consisting of: 2-hydroxyethyl acrylate, 2-hydroxypropyl acrylate, 2-hydroxybutyl acrylate, acrylic monoester or methacrylic monoester of glycerol, and acrylic monoester or methacrylic monoester of trimethylolpropane. The polyester polyol is obtained by condensation reaction between one or more carboxylic acids or anhydrides selected from the group consisting of succinic acid, adipic acid, sebacic acid, maleic anhydride, phthalic anhydride, isophthalic acid, and terephthalic acid and one or more polyols selected from the group consisting of ethylene glycol, propylene glycol, diethylene glycol, neopentyl glycol, trimethylolpropane, and glycerol.

In the coating composition provided by the present disclosure, the aliphatic polyisocyanate composition provided by the present disclosure may be used in combination with polyisocyanate compositions of other sources or properties, so as to adjust the performance of the obtained coating composition.

The coating composition provided by the present disclosure may be prepared according to the existing art and using the existing equipment.

With the specific control of the content and distribution of the iminooxadiazinedione structure, the aliphatic polyisocyanate composition provided by the present disclosure may have both a lower viscosity and a better crosslinking property, may significantly reduce the usage amount of a solvent when used in a coating composition, is more environmentally friendly, and also has a better paint film property so that the drying speed, paint film hardness, solvent rub resistance and many other aspects are significantly improved. The preparation method in the present disclosure has a simple process and mild conditions, is easy to operate and control, and is suitable for industrial scale production.

DETAILED DESCRIPTION

The technical solutions of the present disclosure will be further described in detail in conjunction with specific examples below.

In the examples and the comparative examples of the present disclosure, the mass proportion of each component of the polyisocyanate composition was obtained by gel chromatography, where the mass proportion of the trimolecular polymer was represented by "TW" which referred to the area percentage of the peak at the retention time of 25.25 minutes to 26.5 minutes in the gel chromatography, and meanwhile, the mobile phase of the trimolecular polymer was collected.

The gel chromatography test method was performed using LC-20AD/RID-10A, the chromatographic column was MZ-Gel SDplus 10E3A 5 μm (8.0x300 mm), MZ-Gel SDplus 500A 5 μm (8.0×300 mm) and MZ-Gel SDplus 100A 5 μm (8.0×300mm) in series, produced by Shimadzu, and the test conditions were as follows: the mobile phase was tetrahydrofuran; the flow rate was 1.0 ml/min; the analysis time was 40 minutes; and the column temperature was 35° C.

The molar proportion of the trimolecular polymer in the polyisocyanate composition was represented by "TM" which was equal to [TW/(3×molecular weight of isocyanate monomer)]/the sum of the molar proportions of each component in the composition.

The sum of the molar proportions of each component in the composition was obtained by converting the mass proportion of each component obtained by gel chromatography and then adding the converted results together.

The molar percentage of the iminooxadiazinedione structure was represented by "A" which was equal to iminooxadiazinedione structure/(iminooxadiazinedione structure +isocyanurate structure).

The molar percentage of the isocyanurate structure was represented by "T" which was equal to isocyanurate structure/(iminooxadiazinedione structure +isocyanurate structure).

The molar ratio of the iminooxadiazinedione structure to the isocyanurate structure was represented by "X" which was equal to A/T.

The molar percentage of the iminooxadiazinedione structure in the trimolecular polymer was represented by "AT" which was equal to trimolecular iminooxadiazinedione structure/(trimolecular iminooxadiazinedione structure +trimolecular isocyanurate structure).

A, T and AT were measured by 13C-NMR. The instrument used herein was Bruker 400 MHz, the sample concentration was 50% (CDCI3 solution), the test was performed at 100 MHz, the relaxation time was 4 seconds, the number of times of scanning was 2000, and σ=77.0 ppm CDCI3 was used as the shift reference.

The measurement of A and T was taken by means of collecting the nuclear magnetic resonance (NMR) spectrum of the composition (denoted as "Spectrum 1"), and the measurement of AT was taken by means of collecting the NMR spectrum of the components of the trimolecular polymer obtained by gel chromatography (denoted as "Spectrum 2"), that is, AT was measured by means of collecting the NMR spectrum of the substance obtained by concentrating the collected mobile phase of the trimolecular polymer and removing THF.

The isocyanurate structure had an absorption peak near 148.4 ppm.

The iminooxadiazinedione structure had three absorption peaks at 147.8 ppm, 144.4 ppm, 135.2 ppm respectively.

A was calculated in the following manner: in Spectrum 1, integral value near 135.2 ppm/(integral value near 148.4 ppm/3+integral value near 135.2 ppm).

T was calculated in the following manner: in Spectrum 1, (integral value around 148.4 ppm/3)/(integral value near 148.4 ppm/3+integral value near 135.2 ppm).

AT was calculated in the following manner: in Spectrum 2, integral value near 135.2 ppm/(integral value near 148.4 ppm/3+integral value near 135.2 ppm)

The molar ratio of the iminooxadiazinedione structure in the polymer larger than three molecules to the total iminooxadiazinedione structures in the composition was represented by "Y".

The molar ratio Y of the iminooxadiazinedione structure in the polymer larger than three molecules to the total iminooxadiazinedione structures in the composition was equal to (A—TM×AT)/A.

In the examples and comparative examples of the present disclosure, the "reaction conversion rate" referred to the mass ratio of the aliphatic diisocyanate that has been converted through reaction to the mass of the starting aliphatic diisocyanate raw material. If not specified otherwise, other reagents used are commercially available, and if not specified otherwise, the devices or operation methods used are common devices or operation methods in the art.

In the test example of the present disclosure, the performance test of the paint film was performed according to the following method.

Drying time test: drying time reading was obtained using a linear drying time recorder according to the Chinese standard GB/T 1728.

Pendulum hardness test: the sprayed/scraped sample plate was placed at room temperature for 15 to 20 minutes, baked at 80° C. for 30 minutes, allowed to stand at room temperature for 30 minutes, and then subjected to the pendulum hardness test.

Mechanical performance test: after the paint film was obtained through scraping, the paint film was placed at room temperature for 7 days and subjected to test for the pencil hardness and adhesion (cross grid method).

Ethanol rub resistance test: after the paint film was obtained through scraping, the paint film was baked at 70° C. for 30 minutes, placed for 24 hours, and then subjected to the ethanol rub resistance test using a solvent rub resistance tester.

Examples 1-4 and Comparative Examples 1-6 Preparation of aliphatic polyisocyanate compositions The preparation raw materials and process parameters are shown in Table 1, and the general experimental steps are as follows.

Reaction a: 5 kg of aliphatic diisocyanate monomer was placed in a four-neck flask and heated to 50 ° C. under the protection of nitrogen, 10 ml of catalyst tetra-n-butylammonium fluoride (1 M of THF solution, purchased from Aladdin Biochemical Technology Co., Ltd.) was added under stirring conditions, and timing was started. During the reaction process, the reaction temperature was controlled within a range from 55° C. to 70° C., and the aliphatic diisocyanate monomer was quantified by gel chromatography to monitor the reaction conversion rate. When the specified conversion rate was reached, 0.01 mol of terminating agent di-n-butyl phosphate was added to terminate the reaction a to obtain the reaction liquid I.

Reaction b: The reaction liquid I was cooled to 50° C., 3 ml of catalyst DABCO TMR (purchased from Evonik) was added under stirring conditions, and timing was started. During the reaction process, the reaction temperature was controlled within a range from 55° C. to 70° C., and the aliphatic diisocyanate monomer was quantified by gel chromatography to monitor the reaction conversion rate. When the specified conversion rate was reached, 0.01 mol of terminating agent di-n-butyl phosphate was added to terminate the reaction b to obtain the reaction liquid II.

The reaction liquid II was separated at the temperature of 120° C. to 180° C. by thin-film evaporation to obtain a light-colored polyisocyanate product whose composition and viscosity are shown in Table 1.

TABLE 1

Process parameters and compositions of polyisocyanate compositions prepared in Examples and Comparative Examples

| | Diisocyanate monomer | Reaction conversion rate | | Polyisocyanate composition | | | |
|---|---|---|---|---|---|---|---|
| | | Reaction a | Reaction a + Reaction b | Viscosity/ cp, 25° C. | TW | X | Y |
| Example 1 | HDI | 1 | 40 | 2500 | 50 | 0.01 | 0.8 |
| Example 2 | HDI | 20 | 25 | 1000 | 75 | 0.8 | 0.2 |
| Example 3 | HDI | 20 | 65 | 15000 | 30 | 0.4 | 0.5 |
| Example 4 | IPDI | 20 | 60 | 550(1) | 63 | 0.6 | 0.7 |
| Comparative Example 1 | HDI | — | 40 | 2750 | 48 | 0.001 | 0.1 |
| Comparative Example 2 | HDI | — | 25 | 1500 | 71 | 0.005 | 0.15 |
| Comparative Example 3 | HDI | — | 65 | 18000 | 29 | 0.005 | 0.5 |
| Comparative Example 4 | HDI | 25 | — | 800 | 72 | 0.8 | 0.05 |
| Comparative Example 5 | HDI | 65 | — | 13000 | 28 | 0.4 | 0.1 |
| Comparative Example 6 | IPDI | — | 60 | 650(1) | 60 | 0.001 | 0.15 |

(1)The viscosity of the IPDI polyisocyanate was measured based on 70% butyl acetate solution.

Test Example

Coating compositions were prepared using the aliphatic polyisocyanate compositions prepared in Examples 1-4 and Comparative Examples 1-6 and subjected to coating film evaluation.

The coating film evaluation formulation of the HDI-type isocyanate coating composition was as follows: hydroxy acrylic resin (AC1100B) was used in combination with the HDI-type aliphatic polyisocyanate compositions prepared in the above examples and comparative examples, respectively, where the molar ratio of isocyanate groups to hydroxyl groups was 1.1:1, the solid content of the coating was 40%, and the solvent was butyl acetate and xylene whose mass ratio was 1:1. The evaluation results are shown in Table 2.

The coating film evaluation formulation of the IPDI-type isocyanate coating composition was as follows: hydroxy acrylic resin (AC1100B) was used in combination with the IPDI-type aliphatic polyisocyanate compositions prepared in the above examples and comparative examples respectively as well as the commercial HDI trimer product WANNATE HT-100, where the mass ratio of the IPDI-type aliphatic polyisocyanate composition to WANNATE HT-100 was 1:5, the molar ratio of total isocyanate groups to hydroxyl groups was 1.1:1, the solid content of the coating was 40%, and the solvent was butyl acetate and xylene whose mass ratio was 1:1. The evaluation results are shown in Table 3.

TABLE 2

Coating composition performance evaluation based on HDI-type polyisocyanate compositions

| | Composition viscosity (cp, 25° C.) | Drying time (3 and 4 phases/ min) | Pen-dulum hardness | Pencil hard-ness | Ad-hesion | Ethanol rub resis-tance (times) |
|---|---|---|---|---|---|---|
| Example 1 | 2500 | 235 | 0.75 | 2H | Level 0 | 420 |
| Comparative Example 1 | 2750 | 298 | 0.70 | 2H | Level 0 | 340 |
| Example2 | 1000 | 285 | 0.68 | 2H | Level 0 | 360 |
| Comparative Example 2 | 1500 | 314 | 0.64 | 2H | Level 0 | 345 |
| Comparative Example 4 | 800 | 342 | 0.59 | H | Level 0 | 280 |
| Example3 | 15000 | 170 | 0.80 | 2H | Level 0 | 580 |
| Comparative Example 3 | 18000 | 185 | 0.75 | 2H | Level 1 | 560 |
| Comparative Example 5 | 13000 | 212 | 0.73 | 2H | Level 0 | 490 |

TABLE 3

Coating composition performance evaluation based on IPDI-type polyisocyanate compositions

| | Composition viscosity (cp, 25° C.) | Drying time (3 and 4 phases/ min) | Pen-dulum hardness | Pencil hard-ness | Ad-hesion | Ethanol rub resis-tance (times) |
|---|---|---|---|---|---|---|
| Example 4 | 550 | 192 | 0.80 | 3H | Level 0 | 620 |
| Comparative Example 6 | 650 | 238 | 0.75 | 3H | Level 0 | 505 |

As can be seen from the above Comparative Examples 1-3 and 6, when the content of iminooxadiazinedione structure was low, the viscosity of the polyisocyanate composition was relatively high, and as can be seen from the above Comparative Examples 4-5, when the iminooxadiazinedione structure reached a certain amount but was not more distributed in the polymer larger than three molecules, the viscosity of the polyisocyanate composition could be reduced, but the paint film performance was poor when polyisocyanate was used in the coating composition.

As can be seen from the above Examples and Test Example, with the control of the content and distribution of the iminooxadiazinedione structure, the aliphatic polyisocyanate composition provided by the present disclosure may have a lower viscosity, and after the aliphatic polyisocyanate composition is used in the coating composition, the prepared paint film has a faster drying speed, better paint film hardness and better solvent rub resistance, is significantly improved in terms of the comprehensive performance, and thus has great application prospects.

Unless otherwise defined, terms used herein have the same meaning as commonly understood by those skilled in the art.

The embodiments described herein are for illustrative purposes only and are not be intended to limit the scope of the present disclosure, and various alternatives, variations and modifications can be made by those skilled in the art within the scope of the present disclosure. Accordingly, the present disclosure is not limited by the above-described embodiments, but only by the claims.

What is claimed is:

1. An aliphatic polyisocyanate composition, which is prepared by taking an aliphatic diisocyanate as a starting material, is composed of a trimolecular polymer and a polymer larger than three molecules, both of which are formed by the aliphatic diisocyanate, and comprises an iminooxadiazinedione structure and an isocyanurate structure, wherein a molar ratio of the iminooxadiazinedione structure in the composition to the isocyanurate structure in the composition is 0.01-0.8:1, and a molar ratio of the iminooxadiazinedione structure in the polymer larger than three molecules to the iminooxadiazinedione structure in the composition is 0.2-0.8:1;

wherein the iminooxadiazinedione structure is as shown in Formula 1:

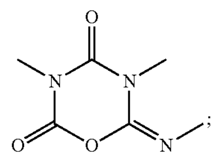

wherein the isocyanurate structure is as shown in Formula 2:

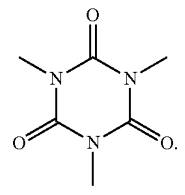

2. The aliphatic polyisocyanate composition according to claim 1, wherein the trimolecular polymer accounts for 30% to 75% of the mass of the aliphatic polyisocyanate composition.

3. The aliphatic polyisocyanate composition according to claim 1, wherein the aliphatic diisocyanate is selected from the group consisting of tetramethylene-1,4-diisocyanate, pentamethylene-1,5-diisocyanate, hexamethylene-1,6-diisocyanate, isophorone diisocyanate, and dicyclohexylmethane diisocyanate.

4. The aliphatic polyisocyanate composition according to claim 3, wherein the aliphatic diisocyanate is selected from the group consisting of hexamethylene-1,6-diisocyanate and isophorone diisocyanate.

5. A preparation method for the aliphatic polyisocyanate composition according to claim 1, comprising the following steps:

S1: taking an aliphatic diisocyanate as a starting material, performing reaction in the presence of a catalyst A to obtain a reaction liquid I, wherein the catalyst A is selected from the group consisting of tetraethylammonium fluoride, tetra-n-butylammonium fluoride, hexadecyltrimethylammonium fluoride, tetramethylammonium triazolate, tetrabutylphosphine triazolate or tetrabutylphosphonium benzotriazolate;

S2: taking the reaction liquid I obtained in step S1 as a raw material, continuing reaction in the presence of a catalyst B to obtain a reaction liquid II, wherein the catalyst B is selected from the group consisting of tetramethylammonium acetate, dodecyltrimethylammonium octanoate, DABCO TMR or N,N,N-trimethyl-N-hydroxypropyl quaternary ammonium salt; and S3: separating unreacted aliphatic diisocyanate by thin-film evaporation.

6. The preparation method according to claim 5, wherein in step S1, when a reaction conversion rate reaches 1% to 20%, the reaction is terminated to obtain the reaction liquid I.

7. The preparation method according to claim 5, wherein in step S2, when the reaction conversion rate reaches 25% to 65%, the reaction is terminated to obtain the reaction liquid II.

8. The preparation method according to claim 5, wherein the reaction in step S1 and step S2 is performed at a temperature of 55° C. to 70° C.

9. A coating composition, comprising the aliphatic polyisocyanate composition according to claim 1.

10. The aliphatic polyisocyanate composition according to claim 2, wherein the aliphatic diisocyanate is selected from the group consisting of tetramethylene-1,4-diisocyanate, pentamethylene-1,5-diisocyanate, hexamethylene-1,6-diisocyanate, isophorone diisocyanate, and dicyclohexylmethane diisocyanate.

11. The aliphatic polyisocyanate composition according to claim 3, wherein the aliphatic diisocyanate is selected from the group consisting of hexamethylene-1,6-diisocyanate and isophorone diisocyanate.

12. The preparation method according to claim 6, wherein in step S2, when the reaction conversion rate reaches 25% to 65%, the reaction is terminated to obtain the reaction liquid II.

13. The preparation method according to claim 6, wherein the reaction in step S1 and step S2 is performed at a temperature of 55° C. to 70° C.

14. The preparation method according to claim 7, wherein the reaction in step S1 and step S2 is performed at a temperature of 55° C. to 70° C.

15. A coating composition, comprising the aliphatic polyisocyanate composition according to claim 2.

16. A coating composition, comprising the aliphatic polyisocyanate composition according to claim 3.

17. A coating composition, comprising the aliphatic polyisocyanate composition according to claim 4.

18. A coating composition, comprising the aliphatic polyisocyanate composition according to claim 10.

19. A coating composition, comprising the aliphatic polyisocyanate composition according to claim 11.

20. The preparation method according to claim 6, wherein the reaction in step S1 and step S2 is performed at a temperature of 55° C.

* * * * *